United States Patent [19]
Kojima et al.

[11] Patent Number: 5,852,119
[45] Date of Patent: Dec. 22, 1998

[54] PRESSURE-SENSITIVE ADHESIVE COMPOSITION AND PRESSURE-SENSITIVE ADHESIVE SHEETS

[75] Inventors: Makoto Kojima; Hironori Tamai; Yoshihide Kawaguchi; Yoshikazu Tanaka; Katsuhide Kojima, all of Osaka, Japan

[73] Assignee: Nitto Denko Corporation, Osaka, Japan

[21] Appl. No.: 891,136

[22] Filed: Jul. 10, 1997

[30] Foreign Application Priority Data

Jul. 18, 1996 [JP] Japan ..................................... 8-189501

[51] Int. Cl.⁶ ....................................................... C08F 8/30
[52] U.S. Cl. ........................... 525/123; 428/343; 428/355
[58] Field of Search ............................. 525/123; 420/343, 420/355

[56] References Cited

U.S. PATENT DOCUMENTS 5,604,035  2/1997  Kojima et al. .......................... 428/355

FOREIGN PATENT DOCUMENTS 00011165   3/1979   European Pat. Off. .
0456840   11/1991   European Pat. Off. .
0594109    4/1994   European Pat. Off. .
2643642    3/1978   Germany .
WO93/13148 7/1996   WIPO .

Primary Examiner—Bernard Lipman
Attorney, Agent, or Firm—Sughrue, Mion, Zinn, Macpeak & Seas, PLLC

[57] ABSTRACT

Disclosed are a pressure-sensitive adhesive composition comprising a reactive mixture of a relatively low molecular weight acrylic prepolymer containing highly reactive hydroxyl groups in the molecule thereof which is obtained by copolymerizing two alkyl acrylate monomers satisfying a specific relationship and, as a chain extender, a polyfunctional isocyanate mainly exhibiting bifunctionality; a pressure-sensitive adhesive composition comprising the above reactive mixture and a relatively high molecular weight polymer component; and pressure-sensitive adhesive sheets having a pressure-sensitive adhesive layer comprising those pressure-sensitive adhesive compositions. Because the molecular chain of the acrylic prepolymer is extended efficiently, the amount of an organic solvent required for viscosity adjustment can be decreased.

14 Claims, No Drawings

PRESSURE-SENSITIVE ADHESIVE COMPOSITION AND PRESSURE-SENSITIVE ADHESIVE SHEETS

FIELD OF THE INVENTION

The present invention relates to a pressure-sensitive adhesive composition and pressure-sensitive adhesive sheets, inclusive of a pressure-sensitive adhesive sheet and a pressure-sensitive tape, prepared by using the pressure-sensitive adhesive composition.

BACKGROUND OF THE INVENTION

Pressure-sensitive adhesive sheets or pressure-sensitive adhesive tapes comprising a substrate, such as paper, a plastic film, woven fabric or nonwoven fabric, having a pressure-sensitive adhesive layer on one or both sides thereof (hereinafter inclusively referred to as "pressure-sensitive adhesive sheets") have been spread for various uses. A variety of pressure-sensitive adhesive compositions have been proposed for formation of the pressure-sensitive adhesive layer according to the respective purposes of use, and natural or synthetic rubber adhesives, acrylic adhesives, vinyl ether adhesives, and silicone adhesives have generally been used. Of those pressure-sensitive adhesives, acrylic pressure-sensitive adhesives are widely employed in various fields because of their essentially excellent resistance to deterioration, such as resistance to weather, solvent and heat, and also ease to control so as to have well-balanced adhesion characteristics, such as adhesive strength, initial adhesive strength (initial tack), and cohesion.

Acrylic pressure-sensitive adhesives generally comprise an acrylic polymer which is obtained by copolymerizing an alkyl (meth)acrylate having a low glass transition temperature as a main monomer and a minor proportion of a polar monomer having a functional group, e.g., a carboxyl group or a hydroxyl group, and which contributes to adhesion and initial tack. If desired, the cohesion of the acrylic polymer can be improved to give well-balanced adhesion characteristics by crosslinking using a peroxide, compounding a trifunctional polyisocyanate, previously copolymerizing a small amount of a crosslinkable monomer, e.g., glycidyl (meth) acrylate), or irradiating with an electron beam.

Because of its own high molecular weight, the conventional acrylic copolymers for acrylic pressure-sensitive adhesives need a large amount of an organic solvent to adjust to an appropriate viscosity for application in the production of adhesive sheets. Further, the acrylic copolymers containing a functional group such as a carboxyl group or a hydroxyl group require a long time for achieving the reaction with a crosslinking agent in the production of pressure-sensitive adhesive sheets due to the low reactivity of the functional group. If a substrate and the acrylic pressure-sensitive adhesive applied thereto are dried at high temperature, the substrate would be damaged.

The inventors of the present invention previously proposed an adhesive composition comprising an alkyl (meth) acrylate copolymer having a carboxyl group or a hydroxyl group in the side chain thereof, in which the carboxyl group or hydroxyl group exhibits enhanced reactivity (see U.S. Pat. No. 5,604,035 corresponding to JP-A-8-100161). This copolymer, being a high-molecular weight substance, requires a large amount of an organic solvent for viscosity adjustment for application.

SUMMARY OF THE INVENTION

Accordingly, an object of the present invention is to provide a novel pressure-sensitive adhesive composition which decreases an amount of an organic solvent used and also uses a highly reactive acrylic prepolymer.

Another object of the present invention is to provide a pressure-sensitive adhesive sheet having a pressure-sensitive adhesive layer comprising the pressure-sensitive adhesive composition.

The conventional acrylic pressure-sensitive adhesive compositions involve various problems that a large amount of an organic solvent is necessary, it is difficult for an acrylic copolymer for this acrylic pressure-sensitive adhesive composition to cause a rapid reaction due to a functional group in the polymer, which should form a reaction point, there are the above-described defects in a crosslinking reaction, and long time is required for crosslinking stabilization.

The inventors have conducted extensive study in order to solve the above-mentioned problems associated with the conventional acrylic pressure-sensitive adhesive compositions. As a result, they have found that the amount of an organic solvent used can be decreased by using a relatively low-molecular weight acrylic prepolymer which is designed so as to exhibit the full reactivity of its functional group (hydroxyl group) and that the acrylic prepolymer is ready to react with an isocyanate group to extend its chain to the high molecular weight suitable for formation of a pressure-sensitive adhesive layer. Further investigations have revealed that the reaction takes place easily in this highly reactive system even in the presence of a relatively high molecular weight polymer component to acquire further improved characteristics. The present invention has been completed based on these findings.

According to a first embodiment of the present invention, there is provided a pressure-sensitive adhesive composition comprising a reactive mixture of (A) an acrylic prepolymer having highly reactive hydroxyl groups in the molecule thereof and a weight average molecular weight of 5,000 to 300,000 which is obtained by copolymerizing (a) 75 to 99.95% by weight of an acrylic monomer represented by formula (I):

$$CH_2=CH(R_1)COOR_2 \qquad (I)$$

wherein $R_1$ represents a hydrogen atom or a methyl group; and $R_2$ represents an alkyl group having 2 to 14 carbon atoms, and (b) 0.05 to 25% by weight of an acrylic monomer represented by formula (II):

$$CH_2=CH(R_1)COOR_3 \qquad (II)$$

wherein $R_1$ represents a hydrogen atom or a methyl group; and $R_3$ represents a monovalent alkyl group having 3 to 14 carbon atoms and at least one hydroxyl group, provided that a positional number n of the carbon atom farthest from an ester bond in formula (I) and a positional number m of the farthest carbon atom from an ester bond that has a hydroxyl group bonded thereto in formula (II) satisfy the relationship: $m \geq n-1$, and (B) a polyfunctional isocyanate mainly acting as a bifunctional chain extender.

According to a second embodiment of the present invention, there is provided a pressure-sensitive adhesive composition comprising (1) a reactive mixture of (A) an acrylic prepolymer having highly reactive hydroxyl groups in the molecule thereof and a weight average molecular weight of 2,000 to 300,000 which is obtained by copolymerizing (a) 75 to 99.95% by weight of an acrylic monomer represented by formula (I):

$$CH_2=CH(R_1)COOR_2 \qquad (I)$$

wherein $R_1$ represents a hydrogen atom or a methyl group; and $R_2$ represents an alkyl group having 2 to 14 carbon atoms, and (b) 0.05 to 25% by weight of an acrylic monomer represented by formula (II):

$$CH_2=CH(R_1)COOR_3 \qquad (II)$$

wherein $R_1$ represents a hydrogen atom or a methyl group; and $R_3$ represents an alkyl group having 3 to 14 carbon atoms and at least one hydroxyl group, provided that a positional number n of the carbon atom farthest from the ester bond in formula (I) and a positional number m of the farthest carbon atom from the ester bond that has a hydroxyl group bonded thereto in formula (II) satisfy the relationship: $m \geq n-1$, and (B) a polyfunctional isocyanate mainly acting as a bifunctional chain extender, and (2) a relatively high molecular weight polymer component having a glass transition temperature of −10° C. or lower and a weight average molecular weight of 200,000 to 1,500,000.

DETAILED DESCRIPTION OF THE INVENTION

The acrylic prepolymer which can be used in the present invention preferably contains 0.5 to 10 hydroxyl groups having high reaction activity (satisfying the relationship: $m \geq n-1$) per molecule on the average so that it may react with an isocyanate group easily to extend its chain to a high molecular weight suitable for formation of a pressure-sensitive adhesive layer. The polyfunctional isocyanate is preferably used in an amount so as to provide 0.1 to 10 equivalents of an isocyanate group per equivalent of the hydroxyl group of the acrylic prepolymer.

The first embodiment of the present invention is advantageous from an economical and environmental standpoint in that the amount of an organic solvent used can be minimized. That is, the pressure-sensitive adhesive component containing the acrylic prepolymer and the polyfunctional isocyanate can be uniformly dissolved in a small amount of an organic solvent to provide a solution of the pressure-sensitive adhesive composition having a high concentration of 40 to 90% by weight.

According to the second embodiment of the present invention, the combined use of the above-described reactive system and a specific polymer component having a relatively high molecular weight makes it possible to control the composition of the pressure-sensitive adhesive, i.e., the distribution of the sol content and the gel content of the pressure-sensitive adhesive, thereby to exhibit broadened adhesion characteristics. The relatively high molecular weight polymer component to be used has a glass transition temperature of −10° C. or lower and a weight average molecular weight of 200,000 to 1,500,000, serving to increase the molecular weight of the sol content in the pressure-sensitive adhesive composition. The polymer component can be either a homopolymer or, in some cases, a copolymer for improving cohesion or the like as the pressure-sensitive adhesive.

The polymer component is preferably an acrylic polymer in view of compatibility with the prepolymer and resistance to weather, solvent and heat. Rubber polymers, polyvinyl ethers, oxyethylene polymers, and urethane polymers can also be used as well so long as the above requirements of glass transition temperature and molecular weight are fulfilled.

The polymer component is preferably used in an amount of 10 to 60% by weight based on the total amount of the reactive mixture and the polymer component. If the glass transition temperature of the polymer component is higher than −10° C., the resulting pressure-sensitive adhesive composition is difficult to apply at low temperatures. If the weight average molecular weight of the polymer component is less than 200,000, no improvement in cohesion of the adhesion properties is produced. On the other hand, if it exceeds 1,500,000, the effect in decreasing the amount of an organic solvent used, which is the object of the present invention as described after, will be lessened.

If the amount of the polymer component together used is less than 10% by weight, the effect of the combined use is small, and the improvement in adhesive strength of the adhesion properties is small. On the other hand, if it exceeds 60% by weight, the effect in decreasing the amount of an organic solvent used, which is the object of the present invention described after, is poor. Wihtin the amount of 10 to 60% by weight, the polymer component is effective in minimizing the amount of an organic solvent used to provide economical and environmental advantages. That is, the pressure-sensitive adhesive component of the present invention containing the above polymer component, the acrylic prepolymer, and the polyfunctional isocyanate can be uniformly dissolved in a small amount of an organic solvent, thereby providing a solution of the pressure-sensitive adhesive composition having a high concentration of 30 to 90% by weight.

The solution of the pressure-sensitive adhesive composition according to the present invention is applied to one or both sides of a substrate, such as a plastic film or paper, and, on heating at a conventional drying temperature, a reaction rapidly takes place to provide a pressure-sensitive adhesive sheet having a satisfactory pressure-sensitive adhesive layer.

Monomer (a) which can be used in the present invention is an alkyl (meth)acrylate having 2 to 14 carbon atoms in the alkyl moiety thereof, being represented by formula (I), which chiefly serves for tack. The alkyl moiety as the ester side chain should have 2 to 14 carbon atoms for ensuring initial tack and adhesion. Monomer (a) is used in a proportion ranging from 75 to 99.95% by weight, preferably from 90 to 99.5% by weight, based on the weight of the entire monomers. If the proportion of monomer (a) is less than 75% by weight, which means an increased proportion of monomer (b), it is difficult to extend the polymer chain by reaction with an isocyanate group. More specifically, although a moderate gel content is necessary for a pressure-sensitive adhesive, the prepolymer comprising too much monomer unit (b) undergoes excessive gelation, interfering with production of a polymer having a necessary molecular weight. If the proportion of monomer (a) exceeds 99.95% by weight, the necessary proportion of the monomer (b) unit, which is described after, is insufficient, making it difficult to achieve the intended chain extension.

Monomer (a) to be used is selected so as to satisfy a specific relationship with monomer (b) as hereinafter described. Examples of useful monomers (a) include ethyl (meth)acrylate, propyl (meth)acrylate, butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, isononyl (meth)acrylate, and decyl (meth)acrylate. These alkyl esters may be straight-chain alkyl esters or branched-chain alkyl esters as structural isomers. These monomers can be used either individually or as a mixture of two or more thereof.

Monomer (b) which can be used in the present invention is a hydroxyalkyl (meth)acrylate having 3 to 14 carbon atoms and at least one hydroxyl group in its alkyl moiety, being represented by formula (II). The hydroxyl group located farthest from the ester bond as a reactive site is at an m-positioned carbon atom in formula (II) (a positional number of the carbon atoms being counted from the ester bond side, hereinafter the same).

Examples of useful monomers (b) include 3-hydroxypropyl (meth)acrylate, 2-methyl-3-hydroxypropyl (meth)acrylate, 4-hydroxybutyl (meth)acrylate, 6-hydroxyhexyl (meth)acrylate, 8-hydroxyoctyl (meth) acrylate, and 10-hydroxydecyl (meth)acrylate. These hydroxyalkyl esters can be used either individually or as a mixture of two or more thereof. Monomer (b) is used in a proportion of 0.05 to 25% by weight, and preferably 0.1 to 10% by weight, based on the weight of the entire monomers.

Monomers (a) and (b) must be selected and combined in such a manner that the positional number m of the farthest carbon atom from the ester bond that has a hydroxyl group bonded thereto in formula (II) and the positional number n of the carbon atom farthest from the ester bond in formula (I) may satisfy the relationship: $m \geq n-1$.

That is, when monomer (a) selected contains n carbon atoms in the alkyl ester moiety thereof, either straight-chain or branched, monomer (b) to be combined therewith should be selected so that the positional number m of the farthest carbon atom from the ester bond that has a hydroxyl group bonded thereto may satisfy the relationship: $m \geq n-1$. For example, in using butyl acrylate (n=4) as monomer (a), monomer (b) is selected from hydroxyalkyl (meth)acrylates having m of 3 or greater, such as 2-methyl-3-hydroxypropyl (meth)acrylate and 4-hydroxybutyl (meth)acrylate.

As far as the above relationship is met, in the acrylic prepolymer comprising monomer (a) and monomer (b), the pendent hydroxyl group derived from monomer (b) is at the same distance as or farther than the terminal carbon atom of the alkyl group derived from monomer (a) from the main chain. As a result, the proportion of the hydroxyl groups that are taken into the molecular side chain of the prepolymer is decreased, and the prepolymer exhibits the inherently high reactivity of a hydroxyl group to effectively achieve chain extension effect and crosslinking effect.

For the purpose of imparting or modifying delicate characteristics as an adhesive, the acrylic prepolymer may further comprise a monomer (c) copolymerizable with monomers (a) and (b) within a range that will not impair the properties by monomers (a) and (b), i.e., in a proportion of 30% by weight or less, preferably 25% by weight or less, based on weight of the entire monomers.

Examples of useful monomers (c) include carboxylic acid-containing monomers, such as acrylic acid, methacrylic acid, itaconic acid, and maleic acid; sulfonic acid-containing monomers, such as 2-acrylamido-2-methylpropanesulfonic acid; phosphorus-containing monomers, such as 2-hydroxyethylacryloyl phosphate and 2-hydroxypropylacryloyl phosphate; amide monomers, such as (meth)acrylamide, N-substituted (meth)acrylamide, 3-acryloyloxypropylamide, 4-acryloyloxybutylamide, 5-acryloyloxyhexylamide, and N-vinylpyrrolidone; vinyl monomers, such as maleimide compounds, vinyl acetate, styrene, and α-methylstyrene; and (meth)acrylic ester monomers other than monomers (a) and (b), such as glycidyl (meth)acrylate, fluorine-containing (meth)acrylates, silicon-containing (meth)acrylates, and (meth)acrylates having an alicyclic, aromatic or heterocyclic ring.

If desired, the acrylic prepolymer may furthermore comprise monomers that are copolymerizable with monomers (a) and (b) and capable of introducing an unsaturated bond into the prepolymer, such as polyfunctional (meth)acrylates. For example, such a monomer can be used to provide crosslinking sites for electron radiation-induced post-crosslinking in the absence of a crosslinking agent. Examples of the monomers serving as a crosslinking agent include hexanediol di(meth)acrylate, (poly)ethylene glycol di(meth)acrylate, (poly)propylene glycol di(meth)acrylate, neopentyl glycol di(meth)acrylate, pentaerythritol di(meth) acrylate, trimethylolpropane di(meth)acrylate, pentaerythritol tri(meth)acrylate, dipentaerythritol hexa(meth)acrylate, epoxy acrylates, polyester acrylates, and urethane acrylates.

The acrylic prepolymer used in the present invention is obtained by copolymerizing monomer (a), monomer (b) and, if desired, monomer (c). The method for copolymerization is not particularly limited. Considering that the pressure-sensitive adhesive composition of the present invention is essentially a kind of acrylic pressure-sensitive adhesive, the relatively high molecular weight polymer component used in the second embodiment of the present invention is preferably an acrylic polymer as previously stated. An acrylic polymer easy to use is one having its glass transition temperature through selection of an acrylic monomer, and molecular weight controlled by means of adjustment of the reaction concentration or the amount of a chain transfer agent.

Polymerization for preparing various acrylic polymers as the acrylic prepolymer and the relatively high molecular weight polymer component, which are used in the present invenion, can be carried out by conventional polymerization methods, including solution polymerization, emulsion polymerization, bulk polymerization, and suspension polymerization. The bulk polymerization which is a solventless polymerization can employ a polymerization by a radiation, such as ultraviolet light.

Polymerization initiators useful in the various polymerization methods include thermal polymerization initiators, such as azo compounds and peroxides; and photopolymerization initiators, such as acetophenone compounds, benzoin ethers, and ketal compounds. Preferable examples of the thermal polymerization initiators are benzoyl peroxide, azobisisobutyronitrile, t-butyl perbenzoate, cumene hydroxyperoxide, diisopropyl peroxydicarbonate, di-n-propyl peroxydicarbonate, di(2-ethoxyethyl) peroxydicarbonate, t-butyl peroxydecanoate, t-butyl peroxypivalate, di(3,5,5-trimethylhexanoyl) peroxide, dilauryl peroxide, dipropionyl peroxide, diacetyl peroxide, and ammonium or potassium persulfate. Preferable examples of the photopolymerization initiators include acetophenone initiators, such as 4-(2-hydroxyethoxy)phenyl 2-hydroxy-2-propyl ketone, methoxyacetophenone, α-hydroxy-α,α'-dimethylacetophenone, and 2,2-dimethoxy-2-phenylacetophenone; benzoin ether initiators, such as benzoin ethyl ether and benzoin isopropyl ether; halogenated ketones, acyl phosphinoxides, and acyl phosphonates.

The molecular weight of the acrylic prepolymer used in the present invention can be controlled to the desired molecular weight by using an appropriate amount of a chain transfer agent. The chain transfer agent to be used is selected appropriately with no particular limitation. Mercaptan type chain transfer agents are most broadly applicable. The weight average molecular weight of the prepolymer is adjusted to 2,000 to 300,000. If it is more than 300,000, the amount of an organic solvent to be used for applying a solution of the pressure-sensitive adhesive composition is not appreciably reduced. If it is less than 2,000, it is difficult to extend the chain to a molecular weight sufficient for forming a pressure-sensitive adhesive.

The acrylic prepolymer thus obtained contains in its molecule active hydroxyl groups derived from monomer (b). The average number of the hydroxyl groups per molecule, which is decided by the proportion of monomer (b) in the total monomer, is preferably 0.5 to 10, particularly 0.5 to 5. If the average number of the hydroxyl groups per molecule is out of this range, the prepolymer tends to have difficulty in increasing its molecular weight to an optimum level.

The pressure-sensitive adhesive composition according to the first embodiment is obtained by compounding the acrylic prepolymer and a polyfunctional isocyanate mainly acting as a bifunctional chain extender. Further compounding the pressure-sensitive adhesive composition of the first embodiment with the relatively high molecular weight polymer component gives the pressure-sensitive adhesive composition of the second embodiment. The polyfunctional isocyanate reacts with the active hydroxyl groups of the prepolymer to extend the chain length of the prepolymer into a polymer suitable as a pressure-sensitive adhesive.

The polyfunctional isocyanate which can be used in the present invention includes aromatic isocyanates, alicyclic isocyanates, and aliphatic isocyanates. Preferable examples of the polyfunctional isocyanates include 2,4-tolylene diisocyanate, 2,6-tolylene diisocyanate, p-phenylene diisocyanate, 4,4'-biphenylene diisocyanate, 4,4'-diphenylmethane diisocyanate, polymethylene polyphenylene diisocyanate, xylene diisocyanate, xylylene diisocyanate, methylenedicyclohexyl diisocyanate, hexamethylene diisocyanate, 4,4',4''-triphenylenemethane triisocyanate, trimeric or oligomeric isocyanates, such as a trimethylolpropane-tolylene diisocyanate or hexamethylene diisocyanate adduct, isocyanate-containing oligomers of polyether urethane type or polyester urethane type, and blocked polyisocyanates capable of releasing isocyanate groups on heating, such as a reaction product of a polyisocyanate and phenol or cresol. These polyfunctional isocyanates can be used either individually or as a mixture of two or more thereof.

The polyfunctional isocyanate is preferably used in an amount corresponding to 0.1 to 10 equivalents of an isocyanate group per equivalent of the active hydroxyl group of the prepolymer. If the amount of the isocyanate group is less than 0.1 equivalent, it would be difficult to secure the efficiency of chain extension or the necessary gel content when the number of the hydroxyl groups introduced into the prepolymer is small. If it is more than 10 equivalents, the efficiency of chain extension is reduced in the presence of excess isocyanate groups, tending to fail to obtain satisfactory adhesion properties.

The pressure-sensitive adhesive composition of the present invention can contain an external crosslinking agent for additional crosslinking treatment in order to improve cohesive force. For example, an additional amount of a polyfunctional isocyanate can be added, or a melamine resin, an epoxy resin, an aziridine compound, a peroxide, a metal chelate compound, etc. can be added.

If desired, the pressure-sensitive adhesive composition of the present invention can further contain natural or synthetic resins and additives, such as fats and oils, surface active agents, various fillers (e.g., glass fiber, glass beads, metal powder, inorganic powder), pigments, dyes, and the like. These components can be added in an amount of 200 parts by weight or less per 100 parts by weight of the sum of the reactive mixture and the relatively high molecular weight polymer component.

The present invention also relates to pressure-sensitive adhesive sheets comprising a substrate having formed on one or both sides thereof a pressure-sensitive adhesive layer made from the above-described pressure-sensitive adhesive composition. The pressure-sensitive adhesive sheets, inclusive of a pressure-sensitive adhesive tape and a pressure-sensitive adhesive sheet, can be prepared by applying the pressure-sensitive adhesive composition to one or both sides of a substrate, such as a plastic film or sheet, paper, woven fabric, nonwoven fabric, a foamed plastic film or sheet, a metal foil, or a laminate of these materials, at a dry thickness of about 5 to 2,000 $\mu$m.

The pressure-sensitive adhesive sheets of the present invention may be rolled up with the back side of its substrate coated with a conventional release agent, such as silicone resins, fluorine resins, and long-chain alkyl type release agents. Alternatively, the exposed pressure-sensitive adhesive layer may be covered with a separator having a film of the conventional release agent.

As described above, the pressure-sensitive adhesive composition according to the present invention comprises a reactive mixture of a relatively low molecular weight acrylic prepolymer containing highly reactive hydroxyl groups in the molecule thereof and, as a chain extender, a polyfunctional isocyanate mainly exhibiting bifunctionality. In the acrylic prepolymer, the steric hindrance of the side chains to the reactivity of the hydroxyl groups is eliminated to secure the inherent reactivity of the hydroxyl group. As a result, the chain of the relatively low molecular weight prepolymer can be extended efficiently to gain a high molecular weight. Accordingly, the pressure-sensitive adhesive composition of the present invention can be supplied as a highly concentrated solution using a decreased amount of an organic solvent.

Where the reactive mixture is combined with a specific polymer component having a relatively high molecular weight, the pressure-sensitive adhesive composition can have an arbitrary sol content having a relatively high molecular weight, thereby making it possible to provide a highly concentrated solution of the pressure-sensitive adhesive composition.

Highly reliable pressure-sensitive adhesive sheets exhibiting satisfactory adhesion characteristics can be obtained by using these pressure-sensitive adhesive compositions.

The present invention will now be illustrated in greater detail with reference to Examples in view of Comparative Examples, but it should be understood that the present invention is not construed as being limited thereto. Unless otherwise indicated, all parts and percents are by weight.

The tests for evaluation conducted in the Examples and Comparative Examples were in accordance with the following methods.

1) Adhesive Strength (JIS Z0237):

A pressure-sensitive adhesive sheet prepared was slit into 20 mm wide tape. A test piece of the pressure-sensitive adhesive tape was adhered to a stainless steel plate (SUS-304) having been polished with a sand paper (#280) and pressed with a double stroke of a 2 kg rubber roll. After allowing the test piece as adhered to stand for 30 minutes, the test piece was peeled off at a peel angle of 180° to the stainless steel plate and at a peel rate of 300 mm/min to measure the peel strength.

2) Holding Power (JIS Z0237)

A 10 mm wide and 20 mm long test piece was cut out of a presuure-sensitive adhesive sheet prepared, and then adhered to a Bakelite plate over half its length (10 mm), and a 500 g weight was loaded at the free end of the test piece. After allowing the test piece to stand at 40° C., the length of a slide of the test piece (mm/hr) was measured.

PREPARATION EXAMPLE 1

A reaction vessel equipped with a condenser, an inlet of nitrogen, and a stirrer was charged with 300 parts of n-butyl acrylate (BA), 2.085 parts of 6-hydroxyhexyl acrylate (HHA), 0.580 part of lauryl mercaptan (LSH) as a chain transfer agent, 0.3 part of azobisisobutyronitrile (AIBN) as a polymerization initiator, and 200 parts of ethyl acetate. Polymerization was conducted at 60° C. for 4 hours and then at 70° C. for 2 hours to obtain a solution of a hydroxyl-containing acrylic prepolymer at a conversion of 99%.

The solution had a viscosity of 130 poises at 25° C. It was a high concentration solution containing 62.8% of the acrylic prepolymer on a solid basis after drying at 120° C. for 2 hours. The prepolymer had a weight average molecular weight of 189,000 and a number average molecular weight of 63,600 calibrated by styrene by gel permeation chromatography (GPC). As calculated from the number average molecular weight, the average number of hydroxyl groups per molecule is 2.55.

PREPARATION EXAMPLE 2

A solution of a hydroxyl-containing acrylic prepolymer was obtained at a conversion of 99% in the same manner as in Preparation Example 1 above, except for replacing HHA with 1.406 part of 2-hydroxyethyl acrylate (HEA).

The physical properties of the solution and the acrylic prepolymer were almost the same as those obtained in Preparation Example 1. However, the acrylic prepolymer has the relationship between monomer (a) and monomer (b) of n=4 and m=2, and thus does not satisfy the relationship: $m \geq n-1$.

PREPARATION EXAMPLES 3 TO 5

Polymerization was carried out in the same manner as in Preparation Example 1, except for changing the amounts of HHA and LSH to prepare a hydroxyl-containing acrylic prepolymer having various properties as shown in Table 1.

TABLE 1

| | Preparation Example | | |
|---|---|---|---|
| | 3 | 4 | 5 |
| Component (parts): | | | |
| BA | 300 | 300 | 300 |
| HHA | 2.081 | 4.191 | 22.197 |
| LSH | 1.164 | 2.568 | 16.106 |
| AIBN | 0.3 | 0.3 | 0.3 |
| Ethyl Acetate | 200 | 200 | 200 |
| Solution Concentration (%) | 61.7 | 61.9 | 64.3 |
| Viscosity (poise) | 19.7 | 6.0 | 1.0 |
| Weight Average Molecular Weight | 96,100 | 53,200 | 9,800 |
| Number Average Molecular | 41,400 | 26,000 | 4,100 |

TABLE 1-continued

| | Preparation Example | | |
|---|---|---|---|
| | 3 | 4 | 5 |
| Weight Number of Hydroxyl Groups per Molecule | 1.7 | 2.1 | 1.7 |

PREPARATION EXAMPLE 6

The same type of the reaction vessel as used in Preparation Example 1 were charged with 300 parts of 2-ethylhexyl acrylate (2-EHA), 1.450 part of 6-hydroxyhexyl acrylate (HHA), 0.403 part of lauryl mercaptan (LSH), 0.3 part of azobisisobutyronitrile (AIBN), and 200 parts of ethyl acetate. Polymerization was conducted at 60° C. for 4 hours and then at 70° C. for 2 hours to obtain a solution of a hydroxyl-containing acrylic prepolymer at a conversion of 98.5%.

The solution had a viscosity of 135 poises at 25° C. It was a high concentration solution containing 62.5% of the acrylic prepolymer on a solid basis after drying at 120° C. for 2 hours. The prepolymer had a weight average molecular weight of 185,000 and a number average molecular weight of 60,800 calibrated by styrene by GPC. As calculated from the number average molecular weight, the average number of hydroxyl groups per molecule is 1.7.

PREPARATION EXAMPLE 7

Preparation of High-Molecular Weight Polymer Component

The same type of the reaction vessel as used in Preparation Example 1 were charged with 300 parts of n-butyl acrylate (BA), 0.332 part of lauryl mercaptan (LSH) as a chain transfer agent, 0.3 part of azobisisobutyronitrile (AIBN) as a polymerization initiator, and 200 parts of ethyl acetate. Polymerization was conducted at 60° C. for 4 hours and then at 70° C. for 2 hours to obtain a polymer solution at a conversion of 99%.

The solution was a high concentration solution containing 62.3% of the acrylic prepolymer on a solid basis after drying at 120° C. for 2 hours. The polymer had a weight average molecular weight of 300,000 on styrene conversion in GPC.

PREPARATION EXAMPLE 8

Preparation of High Molecular Weight Polymer Component

The same type of the reaction vessel as used in Preparation Example 1 were charged with 300 parts of 2-ethylhexyl acrylate (2-EHA), 0.006 part of lauryl mercaptan (LSH) as a chain transfer agent, 0.3 part of azobisisobutyronitrile (AIBN) as a polymerization initiator, and 200 parts of ethyl acetate. Polymerization was conducted at 60° C. for 4 hours and then at 70° C. for 2 hours to obtain a polymer solution at a conversion of 99%.

The solution was a high concentration solution containing 62.0% of the acrylic prepolymer on a solid basis after drying at 120° C. for 2 hours. The polymer had a weight average molecular weight of 1,000,000 on styrene conversion in GPC.

EXAMPLE 1

100 Parts of the acrylic prepolymer solution obtained in Preparation Example 1 and 0.315 part (equivalent to the hydroxyl groups of the prepolymer) of 4,4'-diphenylmethane diisocyanate (MDI) were mixed to prepare a solution of a pressure-sensitive adhesive composition.

The solution was applied to a 25 μm thick polyester film and dried at 120° C. for 5 minutes to prepare a pressure-sensitive adhesive sheet having a 50 μm thick pressure-sensitive adhesive layer. The pressure-sensitive adhesive sheet had an adhesive strength of 650 g/20 mm and a holding power of 0.2 mm/hr.

COMPARATIVE EXAMPLE 1

100 Parts of the acrylic prepolymer solution obtained in Preparation Example 2 and 0.315 part (equivalent to the hydroxyl groups of the prepolymer) of 4,4'-diphenylmethane diisocyanate (MDI) were mixed to prepare a solution of a pressure-sensitive adhesive composition.

The prepolymer used here does not satisfy the relationship: $m \geq n-1$ as described in Preparation Example 2. Therefore, when the resulting solution was applied to a 25 μm thick polyester film and dried at 120° C. for 5 minutes to prepare a pressure-sensitive adhesive sheet having a 50 μm thick pressure-sensitive adhesive layer, the increase of the prepolymer in molecular weight was so insufficient that the pressure-sesitive adhesive sheet as prepared did not stand the test of evaluation. The pressure-ssensitive adhesive sheet was subjected to the test after aging at 50° C. for 3 days, but the pressure-sensitive adhesive layer showed a cohesive failure.

EXAMPLES 2 TO 5

100 Parts of each of the acrylic prepolymer solutions prepared in Preparation Examples 3 to 6 were mixed with 4,4'-diphenylmethane diisocyanate (MDI) equivalent to the hydroxyl groups of the prepolymer to prepare a solution of a pressure-sensitive adhesive composition.

A pressure-sensitive adhesive sheet was prepared using each pressure-sensitive adhesive solution in the same manner as in Example 1. The results of testing the adhesive strength and the holding power are shown in Table 2 below.

TABLE 2

|  | Example 2 | Example 3 | Example 4 | Example 5 |
| --- | --- | --- | --- | --- |
| Composition (part): |  |  |  |  |
| Prepolymer Solution of Preparation Example 3 | 100 |  |  |  |
| Prepolymer Solution of Preparation Example 4 |  | 100 |  |  |
| Prepolymer Solution of Preparation Example 5 |  |  | 100 |  |
| Prepolymer Solution of Preparation Example 6 |  |  |  | 100 |
| MDI | 0.317 | 0.751 | 3.162 | 0.218 |
| Adhesive Strength (g/20 mm) | 600 | 550 | 400 | 700 |
| Holding Power (mm/hr) | 0.4 | 0.3 | 0.3 | 0.5 |

EXAMPLE 6

100 Parts of the prepolymer solution obtained in Preparation Example 5 were mixed with a trimethylolpropane-tolylene diisocyanate adduct (Colonate L, produced by Nippon Polyurethane Industry Co., Ltd.; NCO content: 13.8%) in an amount varied as shown in Table 3 below to obtain a solution of a pressure-sensitive adhesive composition.

The solution was applied to a polyester film and dried to prepare a pressure-sensitive adhesive sheet in the same manner as in Example 1. The gel content of the pressure-sensitive adhesive layer after drying was approximately 100% in each sample. On evaluating the adhesive strength in the same manner as in Example 1, each sample exhibited moderately low adhesion suitable for use as a strippable pressure-sensitive adhesive sheet.

The gel content as referred to above was measured by putting the pressure-sensitive adhesive layer in a bag made of a porous polytetrafluoroethylene film having a pore size of 0.1 μm, immersing the bag in ethyl acetate having high dissolving power for 1 week at room temperature, and measuring the weight of the residue remaining undissolved. The gel content was expressed in terms of a ratio of the residue to the initial weight of the pressure-sensitive adhesive layer. A gel content suitable for use as a strippable adhesive sheet is 60% or more.

TABLE 3

|  | Sample 1 | Sample 2 | Sample 3 |
| --- | --- | --- | --- |
| Composition (part): |  |  |  |
| Prepolymer Solution of Preparation Example 5 | 100 | 100 | 100 |
| Colonate L | 7.426 | 14.852 | 37.133 |
| NCO Equivalent to OH | 1.0 | 2.0 | 5.0 |
| Adhesive Strength (g/20 mm) | 100 | 100 | slight tack |

EXAMPLE 7

100 Parts of the acrylic prepolymer obtained in Preparation Example 1, 50 parts of the polymer solution having a weight average molecular weight of 300,000 obtained in Preparation Example 7, and 0.315 part (equivalent to the hydroxyl groups of the prepolymer) of 4,4'-diphenylmethane diisocyanate (MDI) were mixed, and the mixture was diluted with ethyl acetate to a concentration of 55% to prepare a solution of a pressure-sensitive adhesive composition.

The solution was applied to a 25 μm thick polyester film and dried at 120° C. for 5 minutes to prepare a pressure-sensitive adhesive sheet having a 50 μm thick pressure-sensitive adhesive layer. The pressure-sensitive adhesive sheet had an adhesive strength of 950 g/20 mm and a holding power of 0.34 mm/hr.

COMPARATIVE EXAMPLE 2

100 Parts of the acrylic prepolymer solution obtained in Preparation Example 2, 50 parts of the polymer solution having a weight average molecular weight of 300,000 prepared in Preparation Example 7, and 0.315 part (equivalent to the hydroxyl groups of the prepolymer) of 4,4'-diphenylmethane diisocyanate (MDI) were mixed and diluted with ethyl acetate to prepare a solution of a pressure-sensitive adhesive composition having a concentration of 55%.

The prepolymer used here does not satisfy the relationship: $m \geq n-1$ as described in Preparation Example 2. Therefore, when the resulting solution was applied to a 25 μm thick polyester film and dried at 120° C. for 5 minutes to prepare a pressure-sensitive adhesive sheet having a 50 μm thick pressure-sensitive adhesive layer, the increase of the prepolymer in molecular weight was so insufficient that the pressure-sensitive adhesive sheet as prepared did not stand the test of evaluation. The pressure-sensitive adhesive sheet was subjected to the test after aging at 50° C. for 3 days, but the pressure-sensitive adhesive layer showed a cohesive failure.

EXAMPLES 8 TO 12

100 Parts of each of the acrylic prepolymer solutions obtained in Preparation Examples 3 to 6 were mixed with a prescribed amount of 4,4'-diphenylmethane diisocyanate (MDI) (equivalent to the hydroxyl groups of the prepolymer), and 50 parts of the polymer solution obtained in Preparation Example 7 or 8. The resulting mixture was diluted with ethyl acetate to a concentration of 55% to prepare a solution of a pressure-sensitive adhesive composition.

A pressure-sensitive adhesive sheet was prepared using the resulting solution and tested in the same manner as in Example 1. The results obtained are shown in Table 4 below.

TABLE 4

|  | Example No. | | | | |
| --- | --- | --- | --- | --- | --- |
|  | 8 | 9 | 10 | 11 | 12 |
| Composition (part): | | | | | |
| Prepolymer Solution of Preparation Example 3 | 100 | | | | |
| Prepolymer Solution of Preparation Example 4 | | 100 | | | |
| Prepolymer Solution of Preparation Example 5 | | | 100 | | |
| Prepolymer Solution of Preparation Example 6 | | | | 100 | |
| MDI | 0.317 | 0.751 | 3.162 | 0.218 | 0.218 |
| Polymer Solution of Preparation Example 7 | 50 | 50 | 50 | 50 | |
| Polymer Solution of Preparation Example 8 | | | | | 50 |
| Adhesive Strength (g/20 mm) | 810 | 800 | 600 | 850 | 900 |
| Holding Power (mm/hr) | 0.4 | 0.3 | 0.3 | 0.5 | 0.4 |

EXAMPLE 13

100 Parts of the acrylic prepolymer solution obtained in Preparation Example 5 were mixed with a trimethylolpropanetolylene diisocyanate adduct (Colonate L, produced by Nippon Polyurethane Industry Co., Ltd.; NCO content: 13.8%) in an amount varied as shown in Table 5 below, and 30 parts of the polymer solution obtained in Preparation Example 8 was further added thereto. The resulting mixture was diluted with ethyl acetate to a concentration of 55% to prepare a solution of a pressure-sensitive adhesive composition.

The solution was applied to a polyester film and dried to prepare a pressure-sensitive adhesive sheet in the same manner as in Example 1. The gel content of the pressure-sensitive adhesive layer after drying was approximately 80% in each sample. On evaluating the adhesive strength in the same manner as in Example 1, each sample exhibited moderately low adhesion suitable for use as a strippable pressure-sensitive adhesive sheet.

The gel content as referred to above was measured in the same manner as described in Example 6. A gel content suitable for use as a strippable pressure-sensitive adhesive sheet is 60% or more.

TABLE 5

|  | Sample 4 | Sample 5 | Sample 6 |
| --- | --- | --- | --- |
| Composition (part): | | | |
| Prepolymer Solution of Preparation Example 5 | 100 | 100 | 100 |
| Polymer Solution of Preparation Example 8 | 30 | 30 | 30 |
| Colonate L | 7.426 | 14.852 | 37.133 |
| NCO Equivalent to OH | 1.0 | 2.0 | 5.0 |
| Adhesive Strength (g/20 mm) | 150 | 150 | 100 |

While the invention has been described in detail and with reference to specific examples thereof, it will be apparent to one skilled in the art that various changes and modifications can be made therein without departing from the spirit and scope thereof.

What is claimed is:

1. A pressure-sensitive adhesive composition comprising a reactive mixture of an acrylic prepolymer having highly reactive hydroxyl groups in the molecule thereof and a weight average molecular weight of 5,000 to 300,000 which is obtained by copolymerizing (a) 75 to 99.95% by weight of an acrylic monomer represented by formula (I):

$$CH_2=CH(R_1)COOR_2 \quad (I)$$

wherein $R_1$ represents a hydrogen atom or a methyl group; and $R_2$ represents an alkyl group having 2 to 14 carbon atoms, and (b) 0.05 to 25% by weight of an acrylic monomer represented by formula (II):

$$CH_2=CH(R_1)COOR_3 \quad (II)$$

wherein $R_1$ represents a hydrogen atom or a methyl group; and $R_3$ represents an alkyl group having 3 to 14 carbon atoms and at least one hydroxyl group, provided that a positional number n of the carbon atom farthest from the ester bond in formula (I) and a positional number m of the farthest carbon atom from the ester bond that has a hydroxyl group bonded thereto in formula (II) satisfy the relationship: $m \geq n-1$, and a polyfunctional isocyanate mainly acting as a bifunctional chain extender.

2. A pressure-sensitive adhesive composition as claimed in claim 1, wherein said acrylic prepolymer has 0.5 to 10 highly reactive hydroxyl groups per molecule on the average.

3. A pressure-sensitive adhesive composition as claimed in claim 1, wherein said polyfunctional isocyanate is present in an amount so as to provide 0.1 to 10 equivalents of an isocyanate group to one equivalent of the hydroxyl group of said acrylic prepolymer.

4. A pressure-sensitive adhesive composition as claimed in claim 1, wherein said acrylic prepolymer is a prepolymer obtained by copolymerizing the monomer (a), the monomer (b), and 30% by weight or less, based on the weight of the entire monomers, of other copolymerizable monomers.

5. A pressure-sensitive adhesive composition as claimed in claim 1, wherein said reactive mixture is dissolved in an organic solvent in a concentration of 40 to 90% by weight.

6. Pressure-sensitive adhesive sheets comprising a substrate having formed on one or both sides thereof an adhesive layer comprising an adhesive composition comprising a reactive mixture of an acrylic prepolymer having highly reactive hydroxyl groups in the molecule thereof and a weight average molecular weight of 5,000 to 300,000 which is obtained by copolymerizing
(a) 75 to 99.95% by weight of an acrylate monomer represented by formula (I):

$$CH_2=CH(R_1)COOR_2 \qquad (I)$$

wherein $R_1$ represents a hydrogen atom or a methyl group; and $R_2$ represents an alkyl group having 2 to 14 carbon atoms, and (b) 0.05 to 25% by weight of an acrylate monomer represented by formula (II):

$$CH_2=CH(R_1)COOR_3 \qquad (II)$$

wherein $R_1$ represents a hydrogen atom or a methyl group; and $R_3$ represents an alkyl group having 3 to 14 carbon atoms and at least one hydroxyl group, provided that a positional number n of the carbon atom farthest from the ester bond in formula (I) and a positional number m of the farthest carbon atom from the ester bond that has a hydroxyl group bonded thereto in formula (II) satisfy the relationship: $m \geq n-1$, and a polyfunctional isocyanate mainly acting as a bifunctional chain extender.

7. A pressure-sensitive adhesive composition comprising
(1) a reactive mixture of
(A) an acrylic prepolymer having highly reactive hydroxyl groups in the molecule thereof and a weight average molecular weight of 2,000 to 300,000 which is obtained by copolymerizing
(a) 75 to 99.95% by weight of an acrylic monomer represented by formula (I):

$$CH_2=CH(R_1)COOR_2 \qquad (I)$$

wherein $R_1$ represents a hydrogen atom or a methyl group; and $R_2$ represents an alkyl group having 2 to 14 carbon atoms, and (b) 0.05 to 25% by weight of an acrylic monomer represented by formula (II):

$$CH_2=CH(R_1)COOR_3 \qquad (II)$$

wherein $R_1$ represents a hydrogen atom or a methyl group; and $R_3$ represents an alkyl group having 3 to 14 carbon atoms and at least one hydroxyl group, provided that a positional number n of the carbon atom farthest from the ester bond in formula (I) and a positional number m of the farthest carbon atom from the ester bond that has a hydroxyl group bonded thereto in formula (II) satisfy the relationship: $m \geq n-1$, and (B) a polyfunctional isocyanate mainly acting as a bifunctional chain extender, and (2) a relatively high molecular weight polymer component having a glass transition temperature of $-10°$ C. or lower and a weight average molecular weight of 200,000 to 1,500,000.

8. A pressure-sensitive adhesive composition as claimed in claim 7, wherein said acrylic prepolymer has 0.5 to 10 highly reactive hydroxyl groups per molecule on the average.

9. A pressure-sensitive adhesive composition as claimed in claim 7, wherein said polyfunctional isocyanate is present in an amount so as to provide 0.1 to 10 equivalents of an isocyanate group to one equivalent of the hydroxyl group of said acrylic prepolymer.

10. A pressure-sensitive adhesive composition as claimed in claim 7, wherein said acrylic prepolymer is a prepolymer obtained by copolymerizing the monomer (a), the monomer (b), and 30% by weight or less, based on the weight of the entire monomers, of other copolymerizable monomers.

11. A pressure-sensitive adhesive composition as claimed in claim 7, wherein said polymer component is an acrylic polymer.

12. A pressure-sensitive adhesive composition as claimed in claim 7, wherein said polymer component is present in an amount of 10 to 60% by weight based on the weight of the sum of said reactive mixture and said polymer component.

13. A pressure-sensitive adhesive composition as claimed in claim 7, wherein said reactive mixture and said polymer component are dissolved in an organic solvent in a total concentration of 30 to 90% by weight.

14. Pressure-sensitive adhesive sheets comprising a substrate having formed on one or both sides thereof an adhesive layer comprising an adhesive composition comprising
(1) a reactive mixture of
(A) an acrylic prepolymer having highly reactive hydroxyl groups in the molecule thereof and a weight average molecular weight of 2,000 to 300,000 which is obtained by copolymerizing
(a) 75 to 99.95% by weight of an acrylic monomer represented by formula (I):

$$CH_2=CH(R_1)COOR_2 \qquad (I)$$

wherein $R_1$ represents a hydrogen atom or a methyl group; and $R_2$ represents an alkyl group having 2 to 14 carbon atoms, and (b) 0.05 to 25% by weight of an acrylate monomer represented by formula (II):

$$CH_2=CH(R_1)COOR_3 \qquad (II)$$

wherein $R_1$ represents a hydrogen atom or a methyl group; and $R_3$ represents an alkyl group having 3 to 14 carbon atoms and at least one hydroxyl group, provided that a positional number n of the carbon atom farthest from the ester bond in formula (I) and a positional number m of the farthest carbon atom from the ester bond that has a hydroxyl group bonded thereto in formula (II) satisfy the relationship: $m \geq n-1$, and (B) a polyfunctional isocyanate mainly acting as a bifunctional chain extender, and (2) a relatively high molecular polymer component having a glass transition temperature of $-10°$ C. or lower and a weight average molecular weight of 200,000 to 1,500,000.

* * * * *